Figure 1:
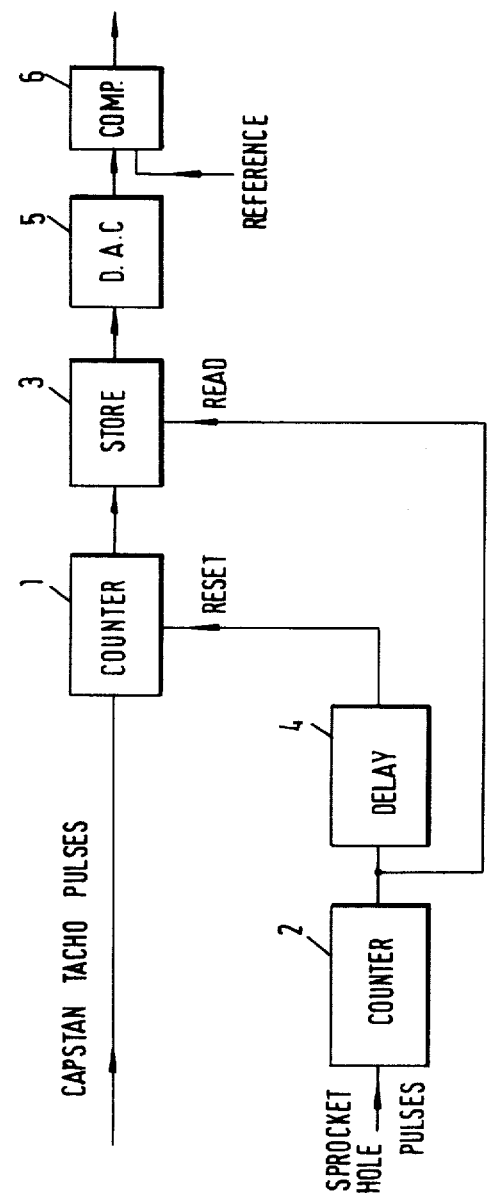

United States Patent [19]

Millward et al.

[11] 4,054,912
[45] Oct. 18, 1977

[54] FILM SCANNER WITH COMPENSATION FOR FILM SHRINKAGE

[75] Inventors: John David Millward, Hitchin; John Wright, Braughing, both of England

[73] Assignee: The Rank Organisation Limited, London, England

[21] Appl. No.: 675,590

[22] Filed: Apr. 9, 1976

[30] Foreign Application Priority Data

Apr. 9, 1975 United Kingdom ............ 14543/75

[51] Int. Cl.² .................... H04N 3/36; H04N 5/36
[52] U.S. Cl. ........................................ 358/216
[58] Field of Search ................ 358/214, 216; 178/DIG. 28

[56] References Cited

U.S. PATENT DOCUMENTS 2,922,841  1/1960  Graziano ............ 178/DIG. 28
3,378,365  4/1968  Goldmark et al. ..... 178/DIG. 28
3,378,635  4/1968  Goldmark et al. ..... 358/216

Primary Examiner—Robert L. Richardson
Attorney, Agent, or Firm—Brisebois & Kruger

[57] ABSTRACT

The invention is concerned with a means of compensating for film shrinkage in a continuous film motion telecine apparatus. A measure of the film shrinkage is obtained by deriving a signal representing the angular speed of a roller in non-slipping contact with the film, the film being driven at a constant frame rate by, for example, a smooth capstan servo-controlled to maintain the constant frame rate. The roller whose angular speed is measured may be the drive capstan itself or a separate roller. The signal so derived is dependent on the film shrinkage and thus is used to automatically control a registration adjusting means to compensate for such shrinkage.

7 Claims, 9 Drawing Figures

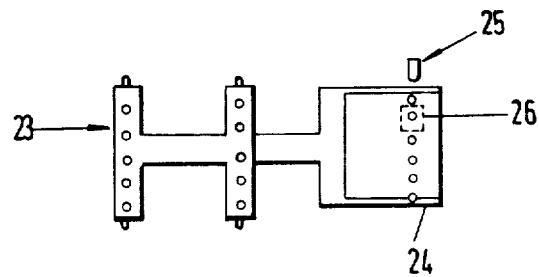
FIG. 5
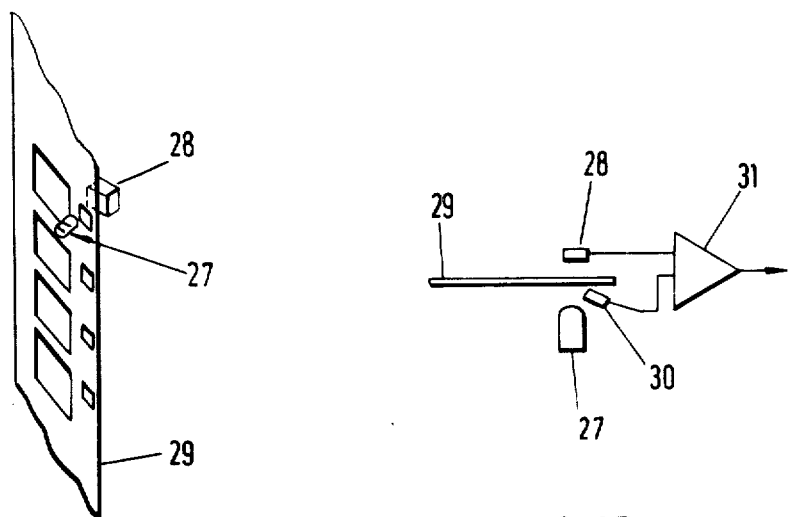
FIG. 6A
FIG. 6B

FILM SCANNER WITH COMPENSATION FOR FILM SHRINKAGE

This invention relates to film shrinkage correction in continuous motion telecine apparatus.

Shrinkage correction is required for jump scan and some twin lens continuous motion telecines because a registration error would otherwise occur. The registration error visually causes double imaging in the extreme and loss of vertical resolution for small errors. The registration error is caused by the fact that the film is moving continuously and therefore each field of the television scan takes place for different positions of the film. Since for any television system the film must move at an absolutely constant frame rate, e.g. 25 frames per sec on 625, if the film is shrunk its actual velocity must be less to maintain the constant frame rate. If we then consider a fixed point on a particular frame of film, the distance it moves in a fixed time is dependent upon film shrinkage. Therefore, since the complementary points on the scanning raster in each field occur a fixed time apart, the distance between these complementary points on the raster must vary to compensate for the film shrinkage. In the case of some twin lens telecines the distance between the twin lenses is adjusted, and with jump scan telecines the distance between the two field scans is adjusted. The present invention is concerned with the case in which such adjustment is automatic.

To automatically compensate the distance between field scans a measurement of film shrinkage has to be made automatically. One some twin lens machines this is done by measuring the distance over a fixed number of sprocket holes between two film drive sprockets.

However, a recent form of telecine does not use film drive sprockets but a smooth capstan or roller instead. Advantages of using a smooth capstan to drive the film are a reduction of film instability due to sprocket drive, ease of fast forward and reverse run, simplification of the projector, and simplification of the lacing procedure. The capstan is servo-controlled so that an absolutely constant film frame rate is maintained, and the only sprocket on the machine is used to obtain sprocket information for the capstan servo. Assuming the latter is operating correctly, the sprocket rotates at a constant speed whatever the shrinkage of the film and thus cannot be used to derive shrinkage information. Some other method not depending upon sprockets is therefore required.

According to the present invention there is provided a continuous film motion telecine apparatus in which during operation an electrical signal representative of film shrinkage is derived from a measurement of the angular speed of a roller in non-slipping contact with the film when the film is being driven at a constant frame rate, and in which the signal so derived is used to automatically adjust a registration compensating means to compensate for such shrinkage.

Figure 2:
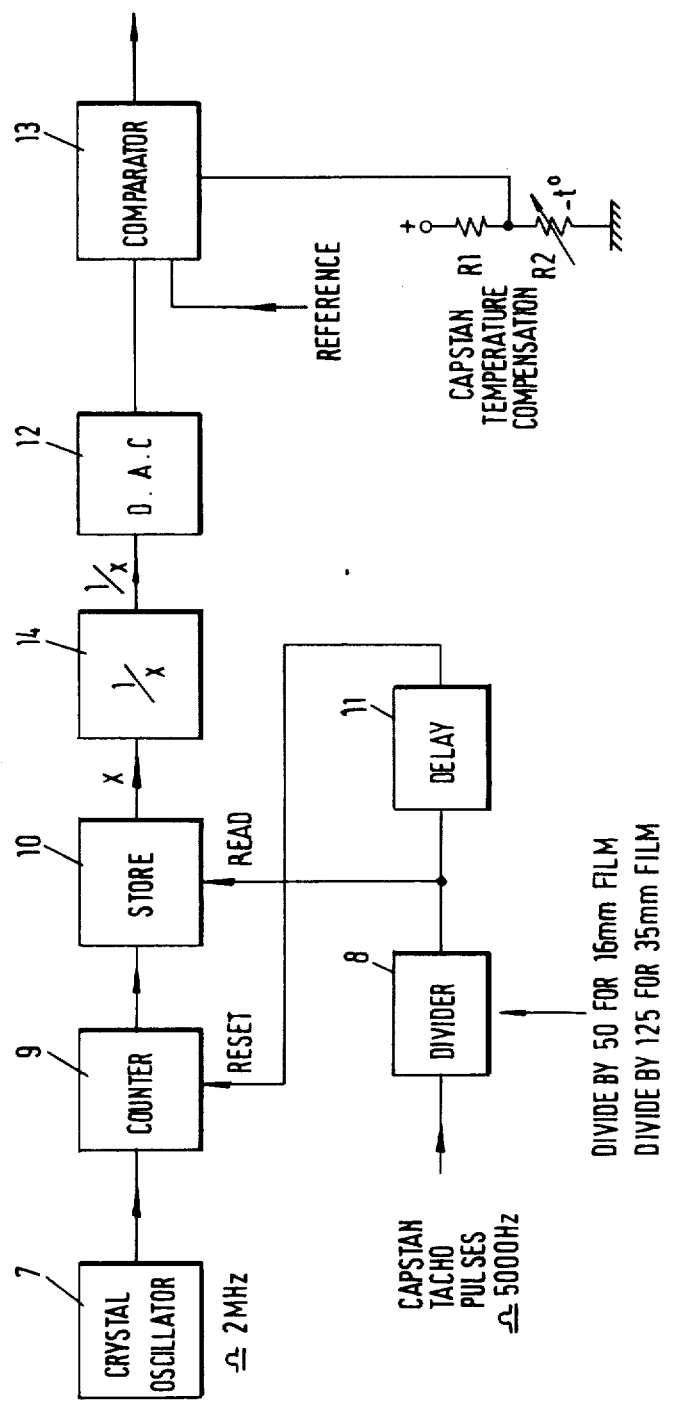
Figure 3:
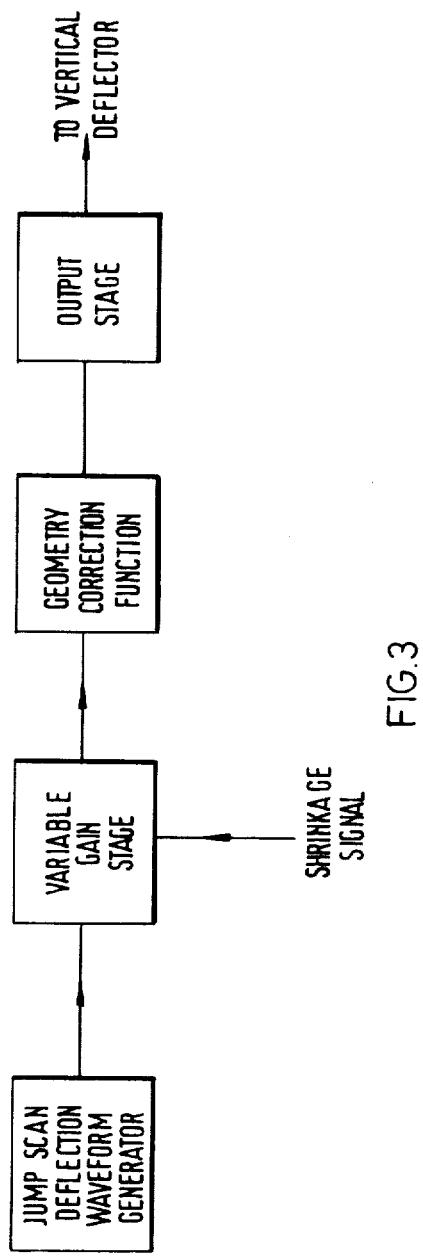
Figure 4A:
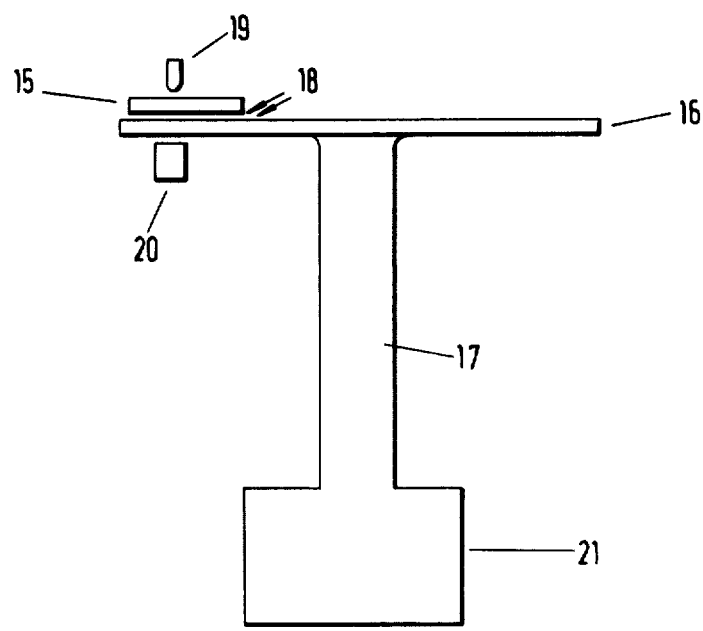
Figure 4B:
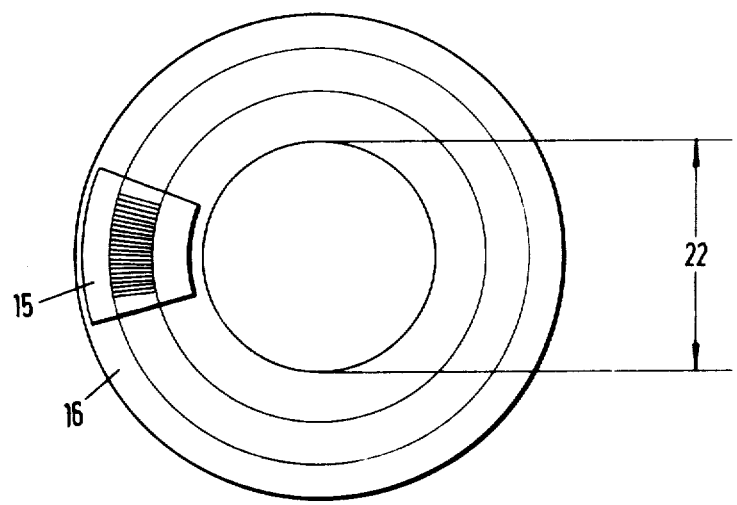
Figure 7:
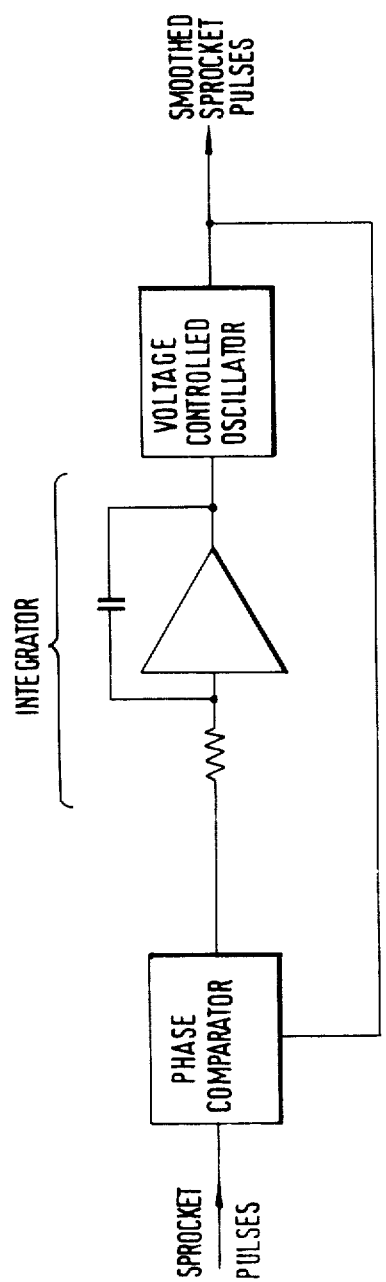

Embodiments of the invention will now be described with reference to the accompanying drawings, in which:

FIG. 1 is a block circuit diagram of a first arrangement for deriving a film shrinkaage correction signal, FIG. 2 is a block circuit diagram of a second arrangement for deriving a film shrinkage correction signal, FIG. 3 shows how the film shrinkage signal may be used to adjust the film scanning rasters of a telecine, FIGS. 4A and 4B show an arrangement for generating capstan tacho pulses, and FIGS. 5 to 7 show arrangements for generating sprocket hole pulses.

The telecine to which the following embodiments of the invention can be applied is, as mentioned before, of the kind which uses a smooth capstan continuously driving the film. The details of the telecine as a whole will not be described since the invention is only concerned with deriving film shrinkage information in such apparatus and using the information in such apparatus to adjust the film scanning rasters or other registration compensating means. In such apparatus, the capstan is servo-controlled to drive the film at a constant number of frames per second, and thus has a velocity directly proportional to the film shrinkage neglecting temperature effects. Calculation shows that the temperature effect is second or third order and therefore can be corrected if required by a secondary temperature compensating loop.

The velocity of the capstan can supply the shrinkage information but as it is necessary to register to within one tenth of a line (0.02%) the velocity should be measured to within 0.01%. Therefore a normal velocity tacho which produces a voltage proportional to the rate of change of flux would not be accurate enough. A straightforward frequency to voltage converter does not normally require to operate to this accuracy.

To measure film shrinkage there has to be some reference and in the case of film this reference is conveniently the sprocket holes. The distance between the sprocket holes when first punched must be compared with any subsequent measurement to obtain the shrinkage.

Since, in the form of telecine under consideration, we cannot use sprockets to measure the distance between sprocket holes, some form of photo-electric or capacitive non-contacting method is required. If the film is stationary, then slightly damaged edges or dirt could lead to considerable errors. In earlier telecines the sprockets overcome this problem by pushing the dirt aside. Therefore we need to make several measurements and take the average if we are to reach the accuracy of 0.01% required (the 0.01% accuracy refers to the distance between the sprocket holes not the actual shrinkage). If the film is stationary, it is more difficult to make this average measurement, therefore the methods to be described only operate when the film is moving.

Two measurements have to be made very accurately, linear film velocity and sprocket hole frequency. The sprocket hole frequency can be measured very accurately photoelectrically by counting pulses with a crystal clock as a time reference. The linear film velocity could be measured by a roller driving a tacho-generator, but a tacho-generator would be difficult to manufacture to give a 0.01% accuracy and there is also the extra drag and friction of the roller and tacho combination. The film is driven by a capstan, therefore by attaching a photoelectric pulse generator to the capstan shaft, and counting the pulses against a crystal time reference, an accurate linear film velocity measurement can be made, assuming sufficient number of pulses are counted, in other words 10,000 pulses for an accuracy of 0.01%. Preferably, however, we can eliminate the crystal time reference since the result required is the ratio of the tacho pulses to sprocket hole pulses. Therefore we can count the number of tacho pulses for a fixed number of sprocket hole pulses. As we need at least 10,000 tacho pulses to obtain the required accuracy of 0.01%, and as the capstan rotates at about one revolution per second it will take 10,000 secs to obtain a measurement with one pulse per revolution of 10,000 pulses per revolution are required to derive a measurement in one second.

A 5,000 pulse tacho disc is obtainable therefore a measurement could be obtained every two or more seconds by the arrangement shown in FIG. 1.

Counter 1 counts the capstan tacho pulses, derived from a photoelectric pulse generator using a 5,000 pulse disc, for a fixed number of sprocket hole pulses as determined by pulse divider or counter 2. Arrangements for generating the capstan tacho pulses and the sprocket hole pulses will be described later with reference to FIGS. 4 to 7. Upon a predetermined count being reached in counter 2, the store 3 reads the count in counter 1 and holds this count until the next read pulse arrives. The counter 1 is reset a short time later after a delay determined by delay element 4. The digital to analogue converter 5 then converts the stored count to a measurement potential where it is compared with a reference in comparator 6 to provide at the output of the comparator a correction signal representative of film shrinkage. The reference is the count which would be obtained for unshrunk film. In theory the store 3 and DAC 5 would be required to operate with up to 14 bits i.e., a count of 16,384, but since the shrinkage never normally exceeds 5% this can be restricted to 10 bits by allowing the counter 1 to cycle up to 20 times. In this example, using 16 mm film, two seconds count would represent approximately 50 sprocket hole pulses. With this low number of sprocket hole pulses per measurement, a badly damaged sprocket hole or large piece of dirt could cause a considerable error for two seconds until the next count. Therefore a considerable improvement could be obtained by using a phase locked oscillator to filter the sprocket hole pulses.

Using the arrangement just described, there is a 2 sec gap between each measurement, and therefore if the film shrinkage is different after a splice, there could be up to 2 secs of incorrect registration. Two solutions would be to reduce the size of the capstan or increase the number of tacho pulses per revolution, but neither of these solutions are desirable for practical reasons.

A preferred solution is that since the sprocket hole pulse period is extremely accurate and constant if the capstan servo is performing as it should be, the tacho pulse period can be measured and the reciprocal taken to obtain a direct measurement of the distance between sprocket holes. This can only be done when the film transport is locked, for example, to a crystal controlled synchronising source as is the case with all broadcast colour television systems. A schematic diagram of such arrangement is shown in FIG. 2. A crystal oscillator 7 and a capstan tacho pulse divider 8 are related by the requirement of a minimum of 10,000 pulses from the oscillator for an accuracy of 0.01%, otherwise the frequency and division ratio are immaterial to the operation of the system and the values are chosen for practical reasons. We have used a crystal oscillator frequency of 2MHz, this being as high as possible to reduce the delay between new measurements but not too high as to make counting difficult. Consequently the capstan tacho pulses were divided by 50 for 16 mm film and 125 for 35 mm film giving a 10 ms count period, resulting in a count of approximately 20,000 pulses. Similarly to the previous example, the counter 9 is allowed to cycle 19 times before registering the final count in 10 bits only. The store 10 reads the count just prior to resetting through delay element 11 and the DAC 12 generates the measuring potential which is compared with a reference in comparator 13. Also included as an input to the comparator 13 is a compensating potential from R1/R2 to compensate for ambient temperature variations of the capstan. R2 is a thermistor which varies its resistance with temperature. The reciprocal function 1/X is shown at 14 operating on the digital signal, but could instead be placed after the DAC 12 and operate on the analogue signal. Also for shrinkage measurements up to about 1% the reciprocal function can be replaced by a straightforward inverting function and the errors will be less than 0.01%. The shrinkage correction signal is provided at the output of the comparator 13.

FIG. 3 shows, in the case of a jump scan telecine, the point of insertion of the shrinkage correction signal derived by either preceding arrangement into the variable gain stage controlling the amplitude of the combined vertical deflection waveform of the telecine raster-producing circuits so that both registration and amplitude errors are compensated. The shrinkage compensated vertical deflection signal is coupled to a geometry correction function, which corrects for the flat faced tube. The deflection coils produce a scan deflection angle proportional to the deflection coil current which results in a tangent function for the position of the deflected on a flat faced tube, therefore the correction function produces a spot deflection on the flat faced screen proportional to the scan deflection waveform.

In the case of a twin lens telecine, the shrinkage correction signal could be used to automatically adjust the spacing between the two lenses.

FIG. 4A is a side view, and FIG. 4B a top view, of an arrangement for generating the capstan tacho pulses. This consists of two discs, one stationary 15 and one rotating 16, the rotating disc 16 being attached to the shaft 17 of the capstan 21 driving the film 22. The stationary disc 15 need only be part of a disc as shown since only a small part of the disc is normally used. Both discs or segment of a disc have a radial pattern of lines equally spaced, which alternately allow light to pass or not to pass. The stationary disc or segment of a disc 15 is placed parallel and as close as possible to the rotating disc 16 without actually touching. The discs are usually made of glass and the radial lines produced by etching a thin metal surface layer 18 on each. When the discs are placed close together, the metallised layers are adjacent.

A source of light 19 is placed on one side of the pair of discs and a photocell 20 on the other such than when the radial lines on the two discs are in alignment maximum light transmission will occur and maximum signal will be obtained from the photocell. When the rotating disc has moved a distance of half the pitch between lines, minimum light transmission will occur resulting in a minimum signal from the photocell. Therefore if a pair of discs contains 5000 radial lines, 5000 pulses will be obtained for every revolution of the rotating disc.

There are at least two distinct methods of obtaining sprocket hole pulses, these being a free running sprocket with a disc or cylinder attached to the sprocket shaft, and a direct photocell light source combination monitoring the sprocket holes.

The first introduces a sprocket into the system which may seem undesirable but as it is not driving the film but being driven by the film and its moment of inertia can be made low, the disturbance the sprocket introduces can be made negligible. In FIG. 5 the sprocket 23 is shown with an apertured hollow cylinder 24 for deriving the sprocket hole pulses from a light source photocell combination 25/26.

FIG. 6A shows a light source 27 and single photocell 28 on opposite sides of the sprocket hole in the film 29, detecting sprocket holes due to the difference in light transmission. Since the change in light transmission can be small, FIG. 6B shows a method of overcoming changes in light intensity of the source by using a second photocell 30 to monitor the light intensity of the source 27, the outputs of both photocells being fed to a comparator 31.

In both 6A and 6B, foreign matter in the sprocket hole can cause errors and it would be advisable to use a phase locked oscillator to remove such disturbances. The phase locked oscillator can be of known form as shown in FIG. 7.

We claim:

1. In a continuous film motion telecine apparatus, means for deriving a signal representing the angular speed of a roller in non-slipping contact with the film when the film is being driven at a constant frame rate, the value of such signal being dependent upon film shrinkage, and means using said signal to automatically control a registration adjusting means to compensate for such shrinkage.

2. A telecine apparatus according to claim 1, wherein the roller is a drive capstan for the film.

3. A telecine apparatus according to claim 1, wherein the means for deriving a signal comprises means for generating pulses at a frequency proportional to the angular speed of the roller, means for counting the pulses so generated, means for counting film sprocket holes, means for storing the pulse count when a predetermined sprocket hole count is reached, and means for forming an analogue signal representative of the stored count.

4. A telecine apparatus according to claim 1, wherein the means for deriving a signal comprises means for generating first pulses at a frequency proportional to the angular speed of the roller, means for counting the pulses so generated, a source of reference pulses of constant frequency, means for counting the reference pulses, means for storing the reference pulse count when a predetermined first pulse count is reached, and means for forming an analogue signal representative of the stored count.

5. A telecine apparatus according to claim 23, further comprising means for comparing said signal with a reference value corresponding to unshrunk film to provide a correction signal for controlling the adjustment.

6. A telecine apparatus according to claim 4, further comprising means for comparing said signal with a reference value corresponding to unshrunk film to provide a correction signal for controlling the adjustment.

7. A telecine apparatus according to claim 1 wherein the adjusting means adjusts the vertical deflection waveform of the telecine raster-producing circuits.

* * * * *